2,008,259

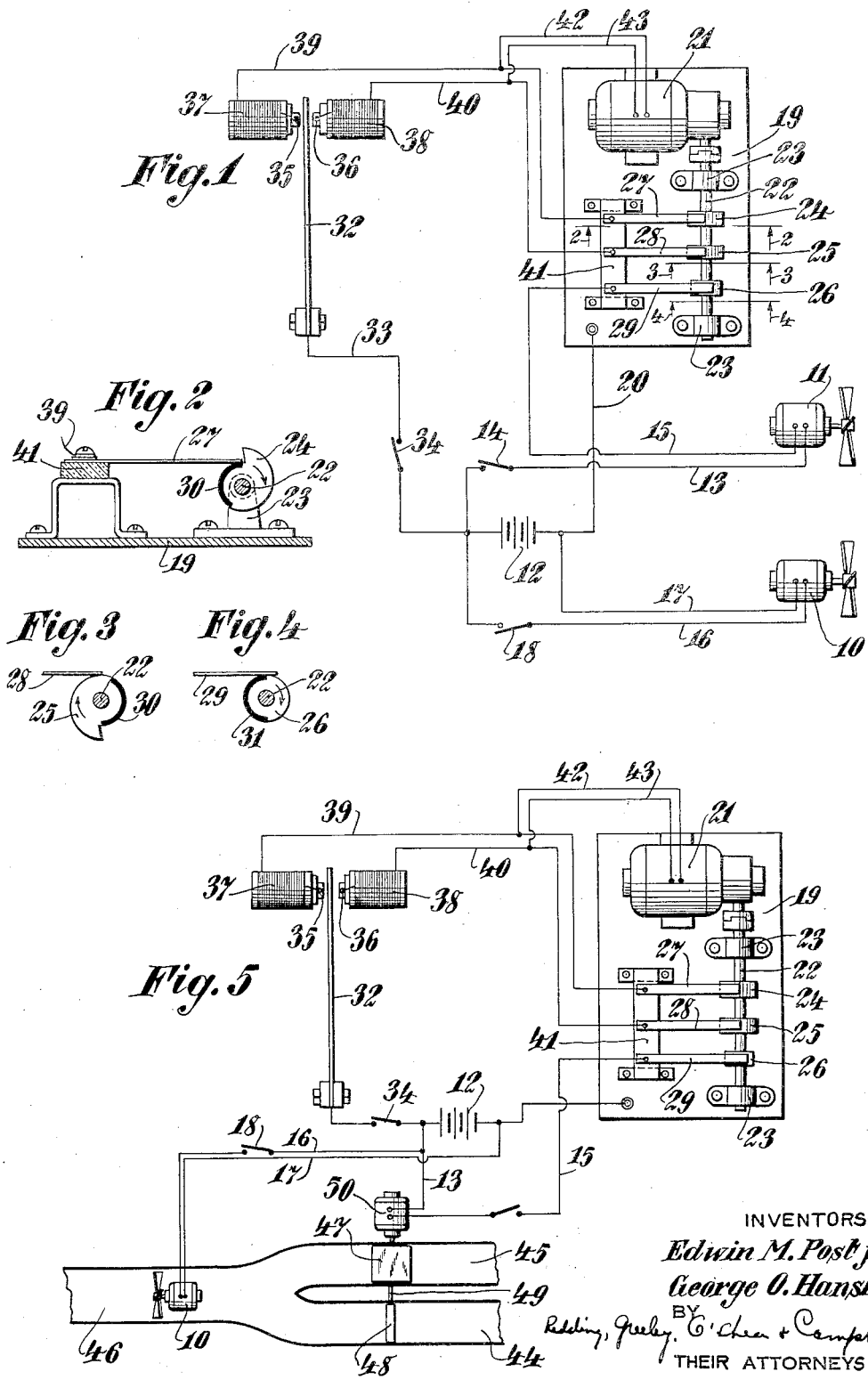
July 16, 1935.  E. M. POST, JR., ET AL  2,008,259
ELECTRICAL SYSTEM FOR REFRIGERATING MECHANISM
Filed Aug. 3, 1932
INVENTORS:
Edwin M. Post jr. and
George O. Hanshew,
BY
THEIR ATTORNEYS Patented July 16, 1935

UNITED STATES PATENT OFFICE 2,008,259

ELECTRICAL SYSTEM FOR REFRIGERATING MECHANISM

Edwin M. Post, Jr., New York, and George O. Hanshew, Forest Hills, N. Y., assignors to International Motor Company, New York, N. Y., a corporation of Delaware Application August 3, 1932, Serial No. 627,311

1 Claim. (Cl. 175—375)

The present invention relates to refrigerating mechanisms and embodies, more specifically, an electrical system for refrigerating mechanisms, wherein a suitable refrigerant is utilized as a cooling medium over which air is circulated from a chamber to be refrigerated. More especially, the invention embodies an electrical system by means of which air is not only circulated in a desired fashion about a refrigerating element but is maintained in an agitated condition within the refrigerating compartment. In commercial refrigeration it is highly desirable that the air within a refrigerating compartment be circulated continuously in order that it may not stagnate and form regions of varying temperatures. In order that a device may be provided by means of which the foregoing may be accomplished, the present invention has been designed and an object thereof is to provide an electrical mechanism for controlling a refrigerating device in such fashion that air is effectively circulated through the refrigerating device and over a refrigerating medium.

A further object of the invention is to provide a mechanism of the above character wherein air is circulated from a refrigerating chamber through a circulating chamber which is separated from the refrigerant, the circulation being effectively controlled to preserve a predetermined temperature range within the refrigerating chamber.

A further object of the invention is to provide a refrigerating mechanism wherein air is circulated over a refrigerating element and through a refrigerating chamber periodically to preserve a predetermined temperature range within the refrigerating chamber, further circulation of air within the refrigerating chamber being effected to insure a desired motion of air within the refrigerating chamber.

A further object of the invention is to provide air circulating means of the above character wherein means is provided to circulate air within a refrigerating chamber during the time that the circulation of air from such chamber over a refrigerating element does not take place.

Further objects, not specifically enumerated above, will be apparent as the invention is described in greater detail in connection with the accompanying drawing, wherein:

Figure 1 is a diagrammatic representation of an electrical system for controlling the air circulation in a refrigerating mechanism in accordance with the present invention.

Figure 2 is a view in section, taken on line 2—2 of Figure 1, and looking in the direction of the arrows.

Figure 3 is a view in section, taken on line 3—3 of Figure 1, and looking in the direction of the arrows.

Figure 4 is a view in section, taken on line 4—4 of Figure 1, and looking in the direction of the arrows.

Figure 5 is a diagrammatic representation of a modified electrical system constructed in accordance with the present invention.

The refrigerating construction with which the present invention is adapted to be used is shown in applicant's copending application Ser. No. 627,310, filed August 3, 1932.

The present invention relates only to the electrical system for controlling the operation of such device and therefore a detailed descripton of the mechanical features of the refrigerating compartment, etc., is deemed unnecessary herein. It will suffice to state that a refrigerating chamber is provided in which a fan 10 is mounted to operate continuously and thus preserve a desired agitation of air within the refrigerating chamber. A circulating compartment which may be subjected to the action of a refrigerant, such as solid carbon dioxide, is associated with the refrigerating chamber and air is circulated through such compartment and the refrigerating chamber by means of a fan 11. Fan 11 is connected to a battery or other source of electrical power 12 by means of a wire 13 and switch 14. The fan 11 is also connected to a wire 15 which is connected to a contacting device which will be described presently.

Fan 10 is connected to battery 12 by means of wires 16 and 17, a switch 18 being connected in the wire 16 to afford a control for the fan 10.

A contacting device 19 is connected to battery 12 through wire 20, the device including an electric motor 21 which is connected to a shaft 22, rotatably mounted in bearings 23 upon the device 19. Shaft 22 is provided with cams 24 and 25 and with a disc 26. Fingers 27 and 28 are adapted to bear upon the peripheries of cams 24 and 25 while finger 29 bears upon the periphery of disc 26.

Cams 24 and 25 are provided with insulating segments 30 while disc 26 is provided with an insulating segment 31. Finger 29 is connected to wire 15 and thus affords a ground connection for motor 11. Within the refrigerating chamber a thermal element 32 is mounted, the thermal element being connected to battery 12 through a wire 33 and switch 34. Element 32 is adapted to engage spaced contacts 35 and 36 which are connected to magnet coils 37 and 38, respectively. These magnets serve as holding magnets for the thermostatic member 32.

Magnet coil 37 is connected to a wire 39 which is connected to contact finger 27 while magnet coil 38 is connected to a wire 40 which is connected to contact finger 28. The contact fingers are mounted upon an insulated plate 41 in order that they may bear upon the peripheries of the cams and disc with a suitable tension and motor 21 is connected to wires 39 and 40 through the respective wires 42 and 43.

The operation of the system is as follows. As stated hereinbefore, fan 10 functions continuously to maintain a predetermined circulation of air within the refrigerating chamber. When contact finger 29 rests upon insulating segment 31, motor 11 does not operate, the contact finger 29 and the conducting surface of disc 26 causing such operation.

When the temperature within the refrigerating chamber rises to a predetermined value, thermal element 32 will engage contact 35 and connect battery 12 to the motor 21 through wires 33, 39 and 42. At this time, finger 27 rests upon the insulating segment 30 of cam 24 and finger 28 rests upon the conducting portion of cam 25. Motor 21 will thus be grounded through wires 40 and 43 and insulating finger 28 and cam 25. Upon establishing these conditions, motor 21 is driven to rotate shaft 22 and place finger 29 upon a conducting portion of disc 26. This starts motor 11 and causes a circulation of air from the refrigerating chamber through the circulating chamber and about the refrigerant.

When the temperature within the refrigerating chamber falls to a predetermined value, the element 32 engages contact 36 and causes further rotation of shaft 22 to place finger 29 upon the insulating segment 31 as shown in Figure 4.

In the construction shown in Figure 5, fan 10 is placed within a conduit communicating with the refrigerating chamber. To avoid the necessity of using two fans, parallel ducts 44 and 45 are connected to a duct 46 within which fan 10 is mounted. Valves 47 and 48 are mounted upon a common valve stem 49 which is actuated by a motor 50. Motor 50 is of the stop type and may be either a solenoid or an electro-magnet. One of the ducts 44 communicates with the circulating compartment having a refrigerant which, in turn, communicates with the refrigerating compartment and the other of the ducts 44 or 45 communicates directly with the refrigerating compartment. When valves 47 and 48 are in the position shown, air from the refrigerant is prevented from flowing into the refrigerating chamber and circulation within such chamber is preserved by the flow of air through duct 45. Motor 50 is connected to finger 29 and is operated during such times as motor 11 is operated in the construction shown in Figure 1.

The provision of electro-magnet coils 37 and 38 in series with contacts 35 and 36 affords a mechanism which eliminates the injurious arcing at such contacts when element 32 moves into and out of contact therewith. As soon as contact is established, the element 32 is held in contact by the electro-magnet until the circuit through such electro-magnet is broken at the cams 24 and 25.

It will thus be seen that an electrical operating and control system has been provided which insures the effective circulation of air in a refrigerating compartment as well as circulation between such compartment and a compartment containing a suitable refrigerant.

Although the foregoing description has been made with reference to a refrigerating mechanism, it will be apparent that the invention may be utilized in connection with any device wherein a heat interchange is to be effected, whether to supply heat or remove it from a chamber.

Obviously, motor 50 may be dispensed with and the valves actuated by a connection directly to shaft 22. Furthermore, the cams 24 and 25 may be circular discs or circuit breakers of any other known and suitable form.

While the invention has been described with specific reference to the accompanying drawing, it is not to be limited, save as defined in the appended claim.

We claim as our invention:

A control system comprising a heat responsive element, spaced contacts actuated by the heat responsive element, electro-responsive means connected across the spaced contacts, a contactor having contacts to control an electrical circuit, means to actuate the contactor by the electro-responsive means, contacts actuated by the contactor each of which is connected to one of the first contacts and to the contactor, and connections to operate the actuating means to actuate the contactor by the first contacts.

EDWIN M. POST, Jr.
GEORGE O. HANSHEW.